Feb. 16, 1971     C. C. HELMS     3,563,656
MONOCHROMATOR WAVELENGTH DRIVES
Filed April 15, 1966     2 Sheets-Sheet 1

INVENTOR.
Charles C. Helms
BY
ATTORNEY.

United States Patent Office 3,563,656
Patented Feb. 16, 1971

3,563,656
MONOCHROMATOR WAVELENGTH DRIVES
Charles C. Helms, 19 Elmstad Road,
Trumbull, Conn. 06611
Filed Apr. 15, 1966, Ser. No. 542,887
Int. Cl. G01j 3/06, 3/18, 3/42
U.S. Cl. 356—96
7 Claims

ABSTRACT OF THE DISCLOSURE

A stepping-motor (of the type which moves in a series of discrete small increments) drives the dispersive element of an optical monochromator, for example, through a variable gear reduction transmission rotating a cam, which in turn angularly moves a lever arm rigidly connected to, say, a diffraction grating. The stepping-motor may be moved at various continuous rates by supplying a series of evenly spaced (in time) pulses at any particular desired rate. Alternately, by providing a "burst" or "train" of a predetermined number of closely spaced pulses, the stepping-motor (and the elements driven thereby) may be rapidly indexed to a desired specific position. Another instrument or component of the same instrument, such as the chart recorder or other readout may be readily synchronized with the monochromator stepping-motor, by utilizing as its drive a second stepping-motor, fed from the same pulse source.

---

Figure 1:
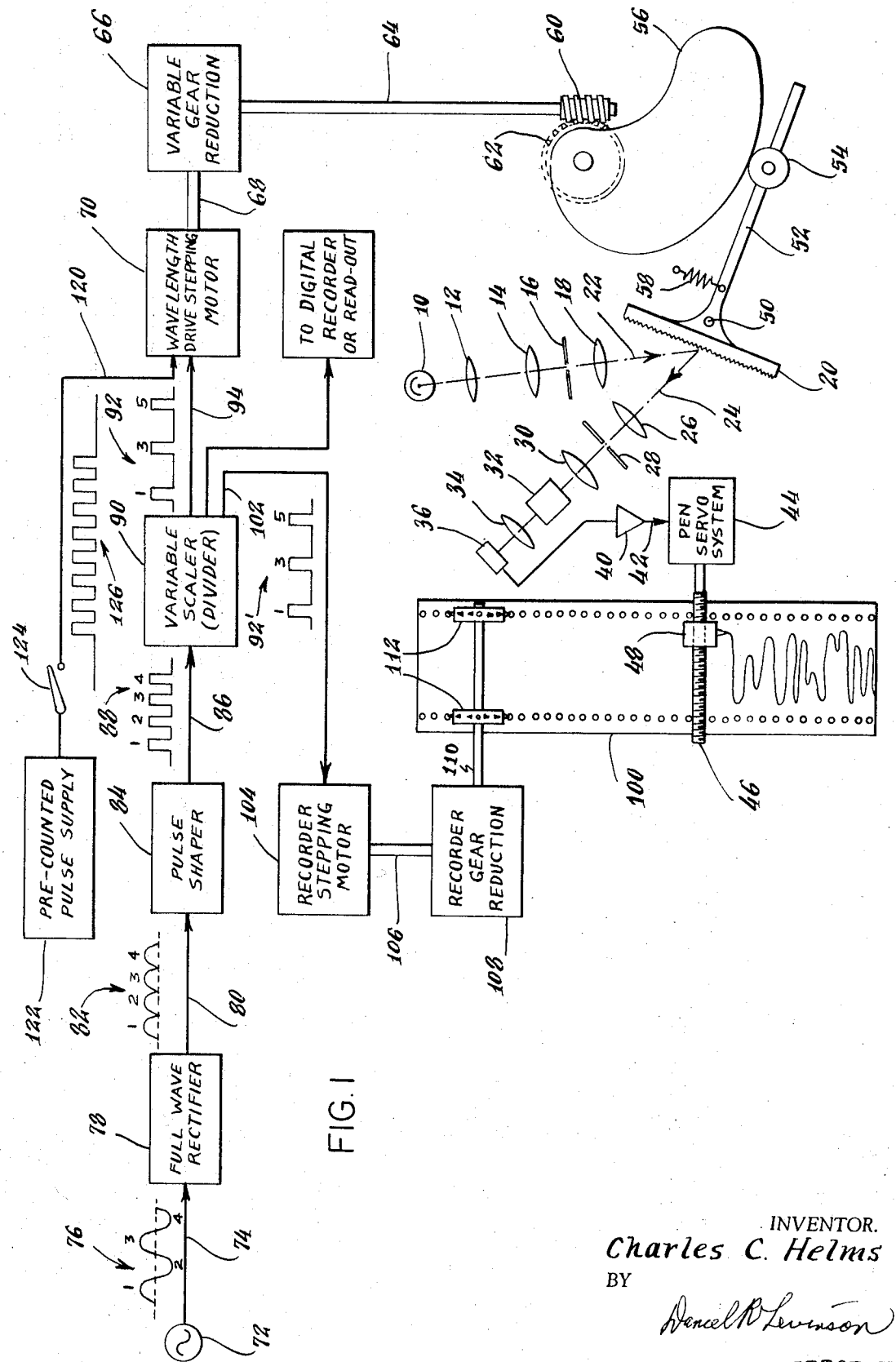

This invention relates to an improved drive for moving the dispersive element of a monochromator.

In particular the invention utilizes a stepping motor so as to move the dispersive element in a series of discrete, although extremely small, angular increments. Preferably those parts of the instrument which should move in accordance with the dispersive element are also "stepped" in a similiar manner. For example in a spectrophotometer the final recording mechanism is preferably provided with a stepped abscissa drive (corresponding to the wavelength setting of the monochromator). Provision is also made for direct output of the wavelength drive position in digital form. Because of the provision of means to alter the effective rate of pulse feed to the wavelength stepping motor (and the corresponding recorder stepping motor), the instrument is capable of a large dynamic scanning speed range of the wavelength drive. Additionally substantially automatic indexing of the dispersive element to any desired position may be accomplished by means providing a "burst" or train of pulses of the necessary number to move the dispersive element from its present position to a desired one.

The invention improves the overall performance of the monochromator in a number of ways. Because the radiation detector of the monochromator receives exactly the same monochromator output for a finite time between each "step" of the dispersive element, the signal-to-noise ratio of the detector is improved (since the detector circuit necessarily has a finite time constant). Because the position of the dispersive element is directly determined by the motor rotor position, the amount of uncertainty in this position is reduced. Further any slight manufacturing error in the exact individual positions to which the motor "steps" is noncumulative. In particular if the various individual steps are all within a certain tolerance of exact equi-angular relationship to each other, not only will the effect of a series of such errors be less than their sum, but in general only a few, say, too large steps would ever occur before one or more too small steps, thereby tending to average out the error. In addition there can be no additive effect of the error in each complete rotation of the motor rotor with any succeeding complete rotation. In fact the error in one complete rotation must necessarily be zero.

Another advantage flowing from the use of a stepping motor in the wavelength drive of the monochromator is the large dynamic speed range. It has been found that the wavelength drive may be readily operated at a plurality of speeds, the ratio of the highest to the lowest being, for example, at least 5,000 to 1. Other advantages of the inventive combination include the ease and precision with which other devices may be positively synchronized in movement with the wavelength drive. For example, the abscissa drive of a chart recorder used to record the detector output, another monochromator or other instrument desired to be ganged (either in parallel or in series) with the original wavelength drive, or any other device may be synchronized by providing additional stepping motors, fed by identical pulses. In addition the output of the pulse circuit for feeding the wavelength stepping motor may be directly utilized in digital storage or operation of other digital data processing apparatus.

An object of the invention is the provision of a high precision wavelength drive in a monochromator, utilizing a stepping motor and pulse input circuits therefor.

Another object is the provision of such a stepping-motor wavelength drive which is readily adapted for synchronous operation with a recorder or other devices.

Figure 2:
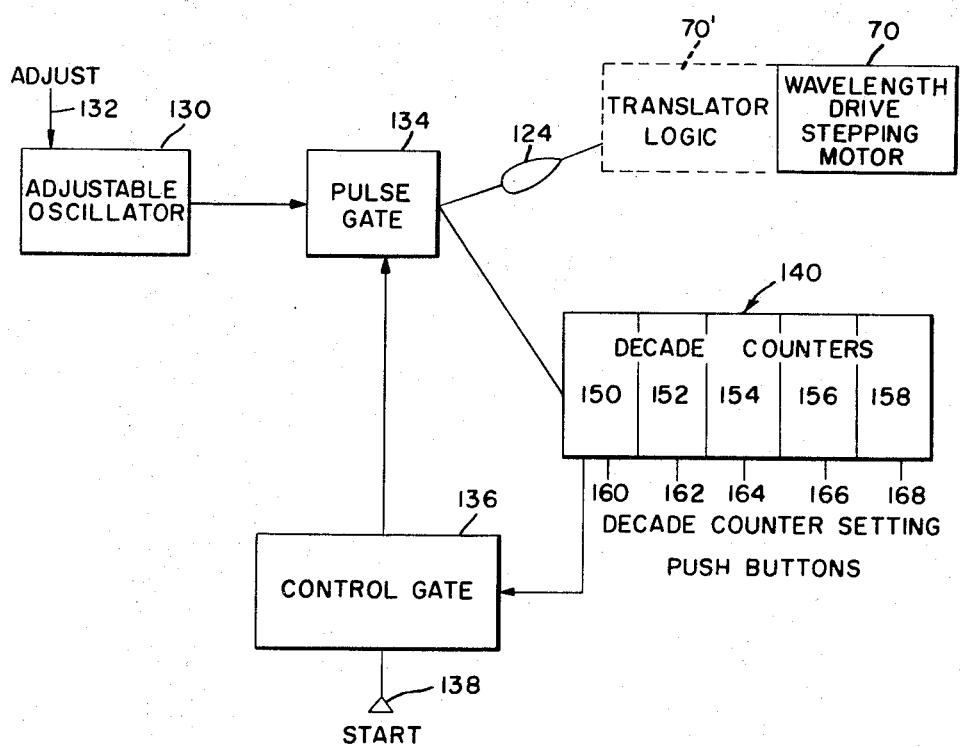

Other objects and advantages of the invention will become obvious to one skilled in the art on reading the following specification in conjunction with the accompanying drawings, in which:

FIG. 1 is a schematic representation of a monochromator employing a stepped wavelength drive; and FIG. 2 is a schematic representation of one form of the "precounted pulse supply" of FIG. 1.

In the drawing FIG. 1, a monochromator of the grating type is schematically illustrated. However, the invention may be utilized with any type of monochromator in which the wavelength of the radiation at its exit slit is controlled by moving an optical element (such as a prism, diffraction grating, or other optical element affecting the dispersive element). Although all of the optical elements having focal power are illustrated as lenses, they may instead actually be, and preferably are, curved reflective elements. In the exemplary grating monochromator, radiation is emitted from a source 10 which is gathered by condensing optical element 12. The condensed radiation is then focussed by element 14 so as to form a bright image of the light source in entrance slit 16. The radiation from this slit image is collimated by element 18 and is then presented to a dispersive element. For exemplary purposes this dispersive element is shown as a reflective diffraction grating 20.

As is well known, the incident collimated radiation at 22 will be diffracted at different angles depending upon its wavelength, so that one beam of a particular wavelength will leave the grating in the direction indicated at 24. This substantially monochromatic beam will be focussed to an image at exit slit 28 by element 26, the exit slit thereby blocking radiation of other wavelengths in a well-known manner. The monochromatic image in the exit slit may then be utilized in various ways, depending on the instrument in which the monochromator is utilized. For exemplary purposes it is assumed that the radiation is passed through a sample material which is intended to be analyzed by spectrometric techniques. For this purpose the radiation from the monochromatic image is rendered substantially parallel by a collimator 30, and then passed to a cell 32 containing the sample.

Assuming that the transmittance (or absorbance) of the sample is the characteristic being measured, the radiation passing through the sample will be gathered by a collecting element 34 and directed onto a radiation detector 36. Such a detector typically supplies an electrical signal at its output (38), which is recorded after amplification at 40. Such recording may take the form of supplying the amplified detector signal at 42 to a servo system 44 which operates a recording means, exemplified by the illustrated mechanical screw connection 46 to a pen assembly 48. In the illustrated example the pen will thus be positioned laterally (i.e. from left to right in the figure) in direct proportion to the amplitude of the detector signal.

The diffraction grating 20 (or other dispersive element) is angularly adjustable about the pivot (50), the angular position being controlled by a lever arm 52, which is in turn angularly controlled by a follower 54 and a cooperating cam 56. The lever arm 52 may be biased by a spring 58 against the driving cam 56, which in turn is driven by a worm and gear 60 and 62. Worm 60 may be, for example, integral with the output shaft 64 of a transmission 66 (which preferably is capable of various speed reductions); the input shaft, 68, is driven in a manner hereinafter described. Generally speaking the mechanism so far described is conventional.

The invention consists primarily in the remaining parts of the apparatus illustrated in the drawings. The means for operating the wavelength drive (and the recorder) will now be described. A stepping motor 70 drives input shaft 68 by causing it to rotate through small equal angular increments. Such stepping motors (or step-servo motors) are commercially available in a variety of sizes and maximum stepping rates. For example, I.M.C. Magnetics Corporation (western division at Maywood, Calif.) and The Superior Electric Co. (Bristol, Conn.), make and sell various models of such motors, the latter under the registered trademark, "Slo-Syn." An article on the "Theory and Operation of Step-Servo Motors," by Anthony P. Morreale appeared in the July 1963 issue of the publication EDN (Electrical Design News) at pages 80 through 91. This article explains most of the electrical and mechanical characteristics of such stepping motors, as well as their advantages over conventional motors. Such stepping motors generally require a relatively simple logic or gating circuit for switching the input voltage sequentially on the various internal windings of the motor to effect the stepping action. Such circuits may also be purchased commercially, for example, from The Superior Electric Co. under the trade names of "Translators," type "ST 250 B" and type "ST 1800" (as described, for example, at pages 16 and 17 of a twenty-page advertising brochure of said company entitled "Slo-Syn (Bulletin SS 1163–1)," apparently printed (and copyrighted) in 1964 under their printing identification number, SE–L46439–A.

Typically each of the steps of the motor 70 will be, say, between 1/10 of a degree to 10 degrees. The variable gear reduction 66 may then move the wavelength drive (exemplified by cam 56) a fraction of the actual motor step, thereby improving the "resolution" by a further factor. As an illustration, if the motor 70 is designed to have 360 steps per rotation, so that each step is one degree, the gear reduction at 66 may be within the range of, say, 1/10 to 1/1000. Additionally the rate (i.e., the number of steps per unit time) of the motor may be varied by changing the pulse rate supplied to its input, as will now be explained.

One way in which the pulse input to the stepping motor 70 may be generated is schematically illustrated at the upper left-hand side of FIG. 1 of the drawing. A source of constant frequency, A.C. voltage 72 (which may be the conventionally available "house current," namely, 120 volts at 60 cycles per second) will supply over line 74 a sine-wave voltage, schematically illustrated at 76. This is fed to a full-wave rectifier 78, which therefore produces at its output 80 a rectified pulsing D.C. voltage having twice the number of peaks as the original voltage at 76. This pulsing D.C. voltage (schematically illustrated at 82) is then fed into a pulse-shaping circuit 84. Both full wave rectifier 78 and pulse shaper 84. Both full wave rectifier 78 and pulse shaper 84 may be any one of the known circuits for accomplishing these respective functions. For example, the rectifier may be of any well-known type in which diodes are either in a bridge or in parallel arrangement in a circuit (see for example The Radio Amateurs Handbook, 43rd edition, 1966, American Radio Relay League, Newington, Conn., at pages 321–322). Pulse shaper 84 may comprise, for example, a Schmitt trigger circuit or a differentiating circuit preferably followed by a limiting or clipping circuit (see for example the above-mentioned handbook, pages 75–76). The output of the pulse shaper 86 therefore will be a series of regularly spaced, single pulses, schematically shown at 88, at twice the frequency of the original voltage source 72. These regular pulses are fed to the input of a variable scaling circuit or divider (90), which therefore has an output consisting of regularly spaced pulses having a repetitive frequency which will be equal to or less than that of pulses 88, as shown at 92. The diagrammatically illustrated output 92, for example, comprises pulses at half the frequency of the input. These pulses are then fed to the regular input 94 of the wavelength drive stepping motor 70.

The instrument so far described operates as follows: the voltage source at 72 (say, 60 cycle A.C.) is converted into 120 cycle pulsing D.C. by rectifier 78. The shaping circuit 84 sharpens this signal into a series of pulses at this same frequency. The effective frequency of these pulses is then divided (by a number equal to or greater than one) by circuit 90. These pulses (at a frequency of up to 120 cycles per second) will then cause the motor 70 to step at the same repetitive rate. Each step will cause rotation of output shaft 68 through a particular angle (say for example, one degree). The output shaft 64 of the gear transmission 66 will then be rotated in a series of incremental steps, each consisting of a (relatively small) particular fraction of a degree. Wavelength cam 56 (and therefore arm 52 and grating 20) will rotate by incremental steps having a known predetermined relationship to the angular steps of shaft 64. Therefore slightly different radiation of very closely adjacent wavelength will be sequentially diffracted from the grating so as to pass through exit slit 28 to detector 36. The intensity of the radiation reaching detector 36 for each of these positions will then cause the pen 48 to assume an analogous position along threaded bar 46.

The chart 100 will be moved relative to the pen in the, say, downward direction of FIG. 1 so as to draw a graph of radiation intensity versus wavelength. One preferable manner of accomplishing this is to move the chart (assuming it is a relatively long or continuous strip chart) by means of a stepping motor inherently synchronized with the wavelength drive motor. As illustrated this may be accomplished by utilizing an auxiliary output lead 102 from the scaling circuit 90 to feed a signal 92' (identical to 92) to the input of the recorder stepping motor 104. Motor 104 therefore rotates its output shaft 106 by the same number of steps (i.e., at the exact same rate) as the output shaft 68 of the wavelength motor. Recorder gear transmission 108 reduces (by an operator-chosen fraction) the angular size of each step (but not the frequency of how often these steps recur). Therefore transmission output shaft 110 rotates in a relatively rapid series of extremely small steps, thereby moving chart 100 in an analogous manner by means of sprockets 112. Thus the paper will be moved in a series of very fine linear steps, each of which is exactly proportional either directly to the same small difference in wavelength or to a small increment of a mathematical function of wavelength. For example, the chart may be calibrated so that each unit length has a constant number of wavelength units, wave numbers, or another function of radiation wavelength or frequency. Since the radiation at the monochromator exit slit (and detector) is stepped proportionally to the chart calibration (by proper choice of the contour of cam 56), the pen will draw a graph of radiation intensity versus, say, wavelength.

In certain types of instruments utilizing monochromators, it is desirable to set the wavelength drive at a series of separate starting points. For example spectrophotometers, when used in certain types of conventional absorbance measurements as well as generally in atomic absorption measurements, are often set to a series of relatively wide spaced wavelengths; and measurements are made only in the neighborhood of each of these discrete settings. In order to provide a rapid indexing of the wavelength drive from one of the settings to the next succeeding one, an auxiliary electrical input 120 may be provided to the stepping motor 70. This auxiliary input is fed a "train" of pulses which are of such number as to advance the motor (and therefore ultimately the dispersive element of the monochromator) through a predetermined angle so that the wavelength drive is moved to the next setting (i.e., the position at which the next relatively narrow wavelength scan is to be performed). One manner in which this may be accomplished will now be explained.

A source of a variable number of pulses (labelled "precounted pulse supply" at 122) is optionally connected to the auxiliary input 120 of the motor 70 as by switch 124. When so connected a predetermined number of pulses (schematically illustrated at 126) may be fed to the motor so as to cause it to move through a corresponding number of steps. By precalibration the number of pulses will be "correct" to cause the wavelength drive (e.g., cam 56) to move the dispersive element from its present position to the next desired setting (the starting point of the next wavelength scan). The precounted pulse supply may be programmed so as to provide a sequence of different trains of pulses, so as to automatically set the wavelength drive to the starting point of the next scan after each previous scan is completed. Thus the instrument may be readily programmed to scan a first relatively narrow wavelength range (for example say, 1.1 through 1.2 microns) in a manner previously described, then automatically to advance to a new starting point (for example, 2.3 microns); scan another range (say, 2.3 through 2.5 microns); then automatically move to a new starting setting (for example, 2.8 microns); scan once more, and so on.

In addition to this essentially automatic operation, the pre-counted pulse supply may be conveniently utilized to set the wavelength drive at a desired position "manually." Thus the control (not shown) in FIG. 1 of this supply 122 would determine the number of pulses which will be fed out may be manually set to the correct number to advance the wavelength drive to the desired position. A push button would then be pressed, and the correct number of pulses would then be fed to the input of stepping motor 70 so as to advance the wavelength drive to this desired position. A commercially available device specifically for this purpose is the "Slo-Syn" "Preset Indexers, SP 250 and SP 1800 Series" of the Superior Electric Co. (described on pages 18 and 19 of the previously mentioned Bulletin SS 1163-1 of that company). As schematically shown in FIG. 2 such indexer may comprise an adjustable oscillator 130 (to yield relatively slow to relatively rapid pulse rates), an output pulse gate 134 therefor, a control gate 136, an "index start command" push button 138, a series 140 of decade counters 150–158, and the necessary connections therebetween to supply the desired number of pulses to the input logic or gating circuit (the so-called "translator") of the motor.

In operation, the operator sets the oscillator to a roughly appropriate pulse generation rate as schematically shown at 132 and the decade counters as by setting push buttons 160–168 to the exact number of pulses desired, and presses the start button 138. The start signal causes the control gate 134 to open the oscillator output gate, so as to allow the pulses to reach the "translator" 70' (and therefore start stepping the motor 70). The decade counters 140 also receive the pulses from the output gate; and after the number corresponding to their set condition are received, the oscillator output gate 134 is closed (through operation of the control gate 136) so as to stop the pulses from reaching the motor. Depending on the number of decade counters provided (for example, 3, 4 or 5 as shown) the "Indexer" will be capable of automatically providing any number of pulses desired up to a certain maximum (for example, 999; 9,999; or 99,999, respectively).

In a semi-automatic mode of operation, the control for pulse supply 122 may consist of a series of push buttons to advance the wavelength drive to any one of a series of desired settings (and may be marked as to the wavelength position to which the grating will be advanced if the particular button is pressed). For example, in atomic absorption spectroscopy it is often desirable to scan only a single (or a very few) narrow wavelength range for each metal measured. However, each of these ranges may be far removed from the normal rest or start position of the wavelength drive (i.e., with the grating at one extreme angular position). In order to advance the wavelength drive to the desired position for the measurement of the narrow region about a particular absorption line, the operator would merely press the appropriate button (which may even carry the symbol of the metal desired to be analyzed, instead of or in addition to the actual wavelength). Each push button would be connected in a specific, different manner to the various counting gates, so as to set them to a particular value, and then open the control gate. When the required number of pulses had been fed to the wave drive stepping motor 70, the counters would actuate the control gate to cut off any further pulses from reaching the motor, as noted previously.

If two (or more) specific narrow wavelength ranges are to be routinely analyzed (for example, in routine atomic absorption for, say, two metals), the push buttons of the precounted pulse supply may advantageously include not only a pair of push buttons for supplying the required number of pulses to move the grating from its rest position to either of these two particular wavelength settings (say, A and B), but also a third push button to move the grating from setting A to setting B. The number of pulses required for any such point-to-point movement of the grating may be readily determined as merely the difference between the number of pulses required to move the grating from its extreme (start) position to one of these positions and the number of pulses to move it from the same start position to the other position. Thus, $N_{AB}=N_{SB}-N_{SA'}$, where $N_{AB}$ is the desired number of pulses to move the grating from wavelength setting A to wavelength setting B, $N_{SB}$ is the known number of pulses required to move the grating from its normal start position to the wavelength position B and and $N_{SA}$ is the known number of pulses necessary to move it from its start position to the wavelength A position. Obviously such preselected movements may be supplied for considerably more than two wavelength settings.

To insure that the precounted pulse supply is connected when desired to be used, switch 124 may be, say, mechanically linked to the various push buttons (or other control) of the precounted pulse supply 122, so as to cause closing of this switch whenever any of the buttons are pressed. Since the existing ratio of the reduction gearing 66 will change the effect that a given number of pulses will have on the angular advancement of the grating, it is preferable that the transmission ratio changer (not shown) be cross-linked to some part of the control means (for example switch 124) of the precounted pulse supply. This may be readily effected by either a solenoid or linkage (actuated by switch 124), which causes variable gear reduction 66 to be shifted to a particular setting. Generally speaking, this will be its lowest numerical ratio (i.e., least reduction) so that the lowest number of steps of motor 70 will effect the desired setting of the wavelength drive relatively rapidly. For example, if the gear reduction 66 provides 1:1, 10:1 and 100:1 speed reductions (the first number being the number of rotations of shaft 68 to produce one rotation of shaft 64), the gearing should be at its 1:1 ratio to effect the most rapid movement of the grating to its desired start position for the particular analysis to be performed. This also minimizes the number of pulses which must be supplied by the precounted circuit 122 to move the grating through any desired angle, thereby requiring only a moderate capacity in the counters of this supply. These counters may, of course, comprise decade counters, binary counters, or any other type.

The invention thus provides a precise, variable speed wavelength drive which is readily synchronized with the recorder or other readout device. The use of a series of extremely small steps not only insures high reproducibility of the wavelength settings, but also increases the effective signal (and therefore signal-to-noise ratio) from the photosensitive detector (by a factor of 1.4). The stepped wavelength drive of the invention is easily adaptable to both automatic and semi-automatic (i.e., push button) indexing of the dispersive element to any desired setting, both rapidly and accurately.

Although a particular circuit arrangement is disclosed for providing the regularly repetitive pulses for effecting a wavelength scan (i.e., elements 72–90) and various circuits are suggested for the indexing pulse supply (i.e., element 122), obviously other circuits may be used for either of these functions. Similarly other changes and alternatives will become obvious to one skilled in the art from the foregoing disclosure. For this reason the invention is not limited to the disclosed types of pulse supplies, monochromator, or recording means. Rather the invention is defined solely by the scope of the appended claims.

I claim:

1. In a monochromator of the type including a dispersive element, drive means for effectively adjusting said element so as to vary the wavelength of the dispersed radiation that passes through an exit slit, a sample cell behind said exit slit, and a photosensitive detector for generating a signal in accordance with the radiation intensity from said sample cell as the radiation wavelength passing through said exit slit onto the sample is varied, the improvement in which said dispersive element drive means comprises:

a stepping motor operatively connected to effectively adjust said dispersive element;

and means for generating a repetitive series of electrical pulses, which are supplied to the input of said stepping motor, causing it to effectively drive said dispersive element in a series of very small increments;

said pulse generating means comprising means for changing the effective pulse frequency supplied to said stepping motor;

whereby the wavelength of the substantially monochromatic radiation passing through the exit slit and falling onto the sample varies in a series of extremely small, known increments so as to accomplish a very close together, point-to-point wavelength scan of the sample over a given wavelength range, and the rate at which said motor and therefore the entire wavelength drive, moves may be changed to provide different wavelength scanning speeds.

2. A stepped monochromator according to claim 1, in which:

said dispersive element drive means additionally comprises a speed reduction means between said stepping motor and the dispersive element being adjusted, whereby each of said final very small increments is substantially smaller than the small steps of said motor, thereby further improving the wavelength resolution of the monochromator.

3. A stepped monochromator according to claim 2, in which:

said speed reduction means is variable as to its speed reduction, whereby the fractional size of each final very small increment relative to each step of the motor may be varied.

4. A stepped monochromator according to claim 1, in which:

said pulse frequency changing means comprises circuit means for effectively suppressing a variable fraction of a series of pulses.

5. A stepped monochromator according to claim 1, in which:

an essentially conventional read-out means is included for receiving the detector signal and for providing output information as to the sample radiation intensity versus the various wavelengths of the substantially monochromatic radiation impinged on the sample;

the means for supplying the wavelength input data to said read-out means comprising a mechanically stepped mechanism, moved in synchronism with the wavelength drive of the dispersive element of the monochromator;

said read-out wavelength input stepped mechanism comprises a second stepping motor;

the input of said second read-out stepping motor being operatively connected to the output of said pulse generating means, supplying the input of said dispersive element drive stepping motor;

whereby said read-out wavelength input stepped mechanism is moved in a series of steps, exactly corresponding in quantity to the very small adjustment increments of the dispersive element.

6. In a monochromator of the type including a dispersive element, drive means for effectively adjusting said element so as to vary the wavelength of the dispersed radiation that passes through an exit slit, a sample cell behind said exit slit, and a photosensitive detector for generating a signal in accordance with the radiation intensity from said sample cell as the radiation wavelength passing through said exit slit onto the sample is varied, the improvement in which said dispersive element drive means comprises:

a stepping motor operatively connected to effectively adjust said dispersive element;

means for generating a repetitive series of electrical pulses, which are supplied to the input of said stepping motor, causing it to effectively drive said dispersive element in a series of very small increments;

and an auxiliary precounted pulse generator optionally connected to the input of said dispersive element drive stepping motor through a switch means;

said auxiliary pulse generator comprising means for supplying at least one series of a known, desired number of rapidly recurring pulses;

whereby the wavelength of the substantially monochromatic radiation passing through the exit slit and falling onto the sample varies in a series of extremely small, known increments so as to accomplish a very close together, point-to-point wavelength scan of the sample over a given wavelength range, and said auxiliary pulse generator may be optionally connected to rapidly move said dispersive element drive stepping motor from an existing position through a known number of steps to a desired, known new position.

7. A stepped monochromator according to claim 6, in which:

said auxiliary precounted pulse generator comprises means for supplying a plurality of different series of known, desired numbers of pulses, and control means are provided therefor, so as to allow optional choice of a particular series having a known specific number of pulses, whereby said dispersive element may be rapidly repositioned from an existing position to a desired new position for a plurality of such pairs of positions.

References Cited

UNITED STATES PATENTS

| | | | |
|---|---|---|---|
| 2,619,600 | 11/1952 | Hamacher | 250—51.5 |
| 2,735,330 | 2/1956 | Polster | 356—86 |
| 2,750,836 | 6/1956 | Fastie | 356—100 |
| 3,257,562 | 6/1966 | Erdman et al. | 356—95 |
| 3,455,636 | 7/1969 | Haswell | 356—89 |

OTHER REFERENCES

Tyler: "In Situ Spectroscopy in Ocean and Lake Waters"; Journal of the Optical Society of America, vol. 55, July 1965, pp. 800–805.

RONALD L. WIBERT, Primary Examiner

F. L. EVANS, Assistant Examiner

U.S. Cl. X.R.

356—100